United States Patent [19]

Yaniger et al.

[11] Patent Number: 4,855,361

[45] Date of Patent: Aug. 8, 1989

[54] CONDUCTIVE POLYMER-POLYIMIDE BLENDS AND METHOD FOR PRODUCING SAME

[75] Inventors: Stuart I. Yaniger, Ventura; Randy E. Cameron, Pacific Palisades, both of Calif.

[73] Assignee: Lockheed Corporation, Calabasas, Calif.

[21] Appl. No.: 158,478

[22] Filed: Feb. 22, 1988

[51] Int. Cl.$^4$ .................. C08L 79/08; H01B 1/00; H01B 1/06
[52] U.S. Cl. .................................. 525/436; 252/500; 525/540
[58] Field of Search ................ 525/436, 540; 252/500, 252/511

[56] References Cited

U.S. PATENT DOCUMENTS

| | | | |
|---|---|---|---|
| 4,025,463 | 5/1977 | Trevoy | 252/500 |
| 4,556,623 | 12/1985 | Tamura et al. | 430/8 |
| 4,615,829 | 10/1986 | Tamura et al. | 252/500 |
| 4,731,408 | 3/1988 | Jasne | 252/500 |
| 4,771,111 | 9/1988 | Tieke et al. | 525/436 |
| 4,998,695 | 1/1989 | Yaniger | 252/500 |

FOREIGN PATENT DOCUMENTS 1519729 4/1968 France .

OTHER PUBLICATIONS

A. G. MacDiarmid et al., Mol. Cryst. Liq. Cryst. 121, 173 (1985).

*Primary Examiner*—Allan M. Lieberman
*Attorney, Agent, or Firm*—Max Geldin

[57] ABSTRACT

A conductive polymer blend which comprises mixing a polyimide with a base-type polymer containing carbon-nitrogen linkages, such as polyaniline, having a polyimide-like group covalently linked to nitrogen atoms of the base-type polymer. The conductive polymer blend is formed by first reacting a base-type non-conductive polymer containing carbon-nitrogen linkages, such as polyaniline, with a carbonyl anhydride, such as 3,3',4,4'-benzophenone tetracarboxylic dianhydride, to form a conductive polymer containing polyimide-like groups covalently linked to nitrogen atoms of the base-type polymer, mixing such conductive polymer with non-conductive polyimide in a suitable solvent, removing the solvent, and forming a conductive continuous phase blend of the polyimide and the conductive polymer.

30 Claims, No Drawings

CONDUCTIVE POLYMER-POLYIMIDE BLENDS AND METHOD FOR PRODUCING SAME

BACKGROUND OF THE INVENTION

This invention relates to the production of electrically conductive polymer materials and is particularly concerned with the production of such materials exhibiting improved mechanical properties, processability, and thermal and environmental stability, and with procedure for producing same.

The free-base form of polyaniline is believed to comprise subunits having the formula:

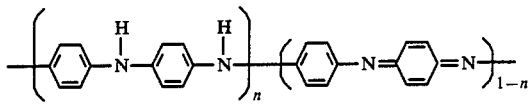

where n is between 0 and 1. The oxidation state of polyaniline referred to as "emeraldine" is believed to have a value of n of about 0.5.

This free-base form of polyaniline is an electrical insulator. Reaction of emeraldine free-base with protonic acids of the form HX, where X is, for example, Cl, causes the polymer to undergo an insulator to conductor transition, as disclosed in A. G. MacDiarmid, et al, Mol. Cryst. Liq. Cryst. 121, 173 (1985). Conductive polyaniline of this type has been employed in batteries as disclosed, for example, in French Patent No. 1,519,729.

However, a number of difficulties have been encountered with the prior art materials noted above. Thus, the conductive polyaniline acid salts are, with a few exceptions, insoluble in most solvent media. None of the polyanilines can be melted. The emeraldine free-base and the conductive forms thereof noted above tend to form powders on removal of the solvent. With some effort, films can be cast; however, they are quite fragile and brittle, easily crumbling to form a powder. The conductive acid salts lose their conductivity when exposed to liquid water. This loss is due to deprotonation. The conductivity loss is reversible; treatment of othe deprotonated material with protic acids restores the conductivity. Further, conductive regions in an insulating matrix tend toward diffusion. For example, if one makes a conductive trace of polyaniline acid salt on a substrate of emeraldine free-base, the trace remains spatially stable for only a short time, eventually spreading out until the substrate has a constant conductivity throughout.

Some of these problems were addressed in U.S. Applications Serial No. 920,474 filed Oct. 20, 1986, now U.S. Pat. No. 4,798,685, of S. I. Yaniger, and Ser. No. 013,305 filed Feb. 11, 1987, now U.S. Pat. No. 4,806,271, of S.I. Yaniger, et al, both assigned to the same assignee as the present application. In these applications, it is disclosed that Lewis acids, for example, alkylating agents, can be used to make the insulating emeraldinen free-base into a conductive polymer salt. Use of proper Lewis acids resulted in conductive polyanilines with the Lewis acid as a side chain. These derivatized polyanilines are more water stable and processable than the prior art emeraldine acid salts. Additionally, no diffusion between "doped" conducting and "undoped" insulating regions was observed.

Thus, in the above U.S. application, Ser. No. 920,474, a base-type non-conductive polymer, such as polyaniline, can be reacted with, for example, methyl iodide, to form an electrically conductive polymer in which the methyl group is covalently linked to the nitrogen atoms of the polymer.

In the above U.S. application, Ser. No. 013,305, emeraldine free-base can be reacted with reagents of the form $RSO_2Cl$, e.g., tosyl chloride, to form an electrically conductive polymer in which the $-SO_2R$ groups are covalently linked to the nitrogen atoms of the polymer.

U. S. Application Ser. No. 158,477 filed Feb. 22, 1988, of S.I. Yaniger and R. E. Cameron and assigned to the same assignee as the prsent application, discloses reaction of a base-type non-conductive polymer, such as polyaniline, with an anhydride, such as tosylic anhydride or benzophenone tetracarboxylic dianhydride, and forming an electrically conductive polymer in which the $-SO_2R$ and $-COR$ groups are covalently linked to the nitrogen atoms of the conductive polymer.

In general, however, the conductive polymers of the above applications tend to be brittle, resulting in inferior mechanical properties.

It would be desirable to blend the relatively brittle conducting polymer with a flexible polymer to form a blend having both the desired electrical properties and good flexibility. A suitable polymer for blending is polyimide. Polyimides have, in general, good mechanical properties, flexibility and thermostability.

To achieve high electrical conductivity, the proportion of conductive polymer in the blend must be relatively high (e.g., greater than 50%) in order for charge to be transferred effectively between polymer chains. Unfortunately, at high polyaniline loadings, the blend materials tend to phase separate, that is, the polyaniline aggregates into clumps within the non-conductive polyimide matrix. These clumps are separated by the matrix material, and the blend thus is an insulator. Further, the mechanical properties of the material suffer upon phase separation. It would be desirable to form blends where the polyaniline is dispersed evenly on a molecular level at all loadings, to thus form a conductive polymer blend.

An object of the present invention accordingly is the provision of improved electrically conductive polymer materials of the class of conductive polyaniline blended with a polyimide.

Another object is to provide conductive polymer materials having improved flexibility, mechanical properties, and thermal stability in the form of a continuous phase blend of a conductive polymer, e.g., conductive polyaniline, and a polyimide.

A still further object is to render polymides conductive by doping with a conductive polymer, such as polyaniline, to produce an easily processable, highly thermally stable conductive polymer blend.

A still further object is to provide novel procedure for producing the above conductive polymer blends.

SUMMARY OF THE INVENTION

The above objects are achieved, according to the invention, by first reacting a base-type non-cnductive polymer, particularly from the family of the polyanilines, with a carbonyl anhydride, such as 3,3',4,4'-benzophenone tetracarboxylic dianhydride (BTDA), to thereby form an electrically conductive polymer, e.g., a derivatized polyaniline, having a polyimide-like group, as defined below, covalently linked to nitrogen atoms of the base-type polymer. This reaction is described in the above application, Ser. No. 158,477 of S. I. Yaniger and R. E. Cameron.

The conductive polymer so formed is mixed with a polyimide or polyimide precursor, in certain ranges of proportions, in a suitable solvent, such as N-methyl pyrrolidone. For improved miscibility of the conductive polymer, e.g., derivatized polyaniline, with polyimide, and for best results, the polyimide contains the same anhydride group as the anhydride used to derivatize the non-conductive polymer, e.g., polyaniline. Upon removal of solvent, the mixture forms a continuous phase blend, the blended materials exhibiting high electrical conductivity and being tough and flexible. Where a polyimide precursor is employed, after removal of solvent, the mixture is heated to conver the precursor to polyimide. The high loading of conductive polymer, e.g., conductive polyaniline, permitted by the invention process, and the formation of a continuous phase blend of the conductive polymer and polyimide confer good electrical conductivity on the polymer blend.

Another advantage of these blends is improved morphology of cast films. For example, emeraldine free-base has a large optical non-linearity in the near infrered (about 1 micron wavelength). It cannot at present be used in non-linear optical devices because cast films of the polymer are fibrillar in nature and tend to scatter light rather than transmit it. Suitable polymer blends, according to the invention, form a continuous phase, with no fibrillar structure. It is again necessary to achieve a high loading of the polyaniline into the optically inactive polyimide so that the large optical activity of the emeraldine is not diluted. This cannot be achieved by prior art technology, as mentioned above.

Another advantage of this invention is that the polyimide matrix serves as a physical barrier against environmental degradation or hydrolysis. This is particularly noticeable when fluorinated polyimides are used, since such polyimides are extremely hydrophobic.

Broadly, the present invention provides a process for producing a unique conductive polymer blend which comprises mixing a polyimide with a conductive polymer comprising a base-type polymer containing carbon-nitrogen linkages having a polyimide-like group covalently linked to nitrogen atoms of the base-type polymer, in a suitable solvent, removing the solvent and forming a conductive continuous phase blend of the polyimide and the conductive polymer.

DETAILED DESCRIPTION OF THE INVENTION AND PREFERRED EMBODIMENTS

A base-type non-conductive polymer containing carbon-nitrogen linkages, such as polyaniline or emeraldine free-base, is first reacted with a carbonoyl anhydride, particularly a dianhydride containing a polyimide-like group having the structural unit:

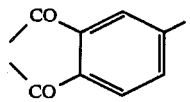

Specific anhydrides which can be employed are pyromellitic dianhydride having the following formula:

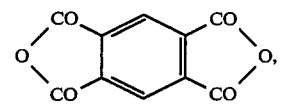

3,3 '4,4'-benzophenone tetracarboxylic dianhydride having the following structure:

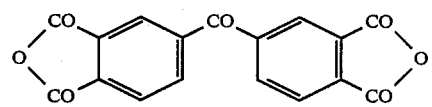

and the fluorinated polyimide oligomer terminated by anhydrides called 6 FDS/APB and having the structure noted below:

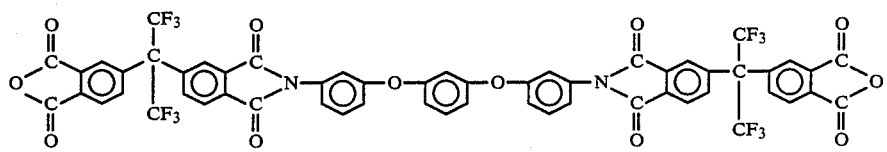

This reaction places polyimide-like groups as side chains connected to the nitrogen atoms of the base-type polymer containing carbon-nitrogen linkages, such as polyaniline, and forms an electrically conductive polymer.

Thus, the reaction between the polyimide oligomer 6 FDS/APB above and polyaniline results in polyaniline derivatized with polyimide oligomer, having the following structural unit:

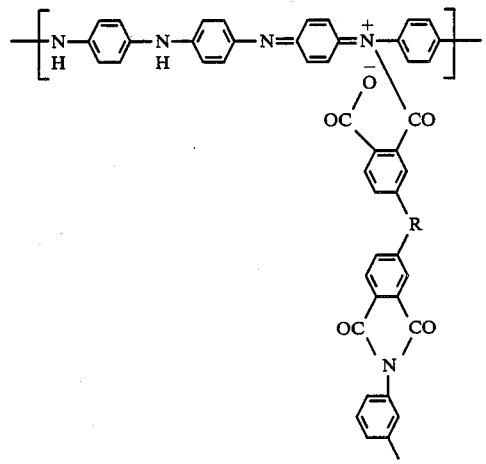

-continued

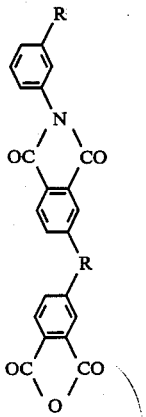

where R =

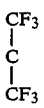

and R' =

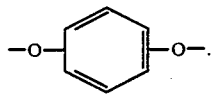

If desired, the base-type polymer containing carbon-nitrogen linkages, such as polyaniline, can be reacted with two different types of anhydrides, including (a) one of the carboxylic anhydirdes noted above and containing polyimide-like groups, and (b) the other being a sulfonic anhydride, such as tosylic anhydride or trifluoromethane sulfonic anhydride. One of such anhdrides, that is, the carboxylic anhydride (a) confers solubility and blendability of the conductive polymer in the desired polyimide matrix, the other sulfonic anhydride (b) conferring the desired electrical conductivity on the polymer blend.

The preferred non-conductive polymer employed for reaction with the anhydride or anhydrides is the basic polymeric starting material, polyaniline emeraldine free-base (PFB).

In place of polyaniline containing phenyl groups, as noted above, there can be employed other non-conductive base-type polymeric starting materials of the polyaniline family, containing naphthalene or biphenyl groups, the resulting conductive polymers thus produced according to the invention being analogous base-type conductive polymers containing naphthyl or biphenyl groups, respectively, and wherein the anhydride groups are covalently linked to nitrogen. Such polymeric starting materials can include other non-conductive base-type polymers containing carbon atoms linked to nitrogen, such as cyanogen polymer containing the recurring unit:

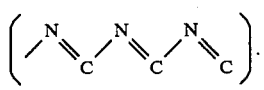

The starting materials of the invention can also include non-conductive mixures and blends of thea bove polymers, and copolymers of the above polymers and other polymers, such as a blend of polyaniline and polymethylmethacrylate, and polymer alloys, such as polybenzimidazole-polyimide alloys, containing carbon-nitrogen groups.

Thus, the term "non-conductive polymer" as employed herein is intended to denote any of the above homopolymer or copolymer materials.

The invention will be described hereinafter, however mostly in terms of the use of the preferred non-conductive free-base polyaniline as polymeric starting material for reaction with an anhydride for production of the preferred highly conductive polyaniline described above.

The process for reacting the non-conductive nitrogen-containing polymer, such as polyaniline, with the anhydirde or anhydrides, is disclosed in detail in above application, Ser. No. 158,477, of S. I. Yaniger and R. E. Cameron, and is incorporated herein by reference.

The molar proportions of anhydride compound to non-conductive nitrogen-containing polymer free-base can range from about 0.1 to about two COR+groups per nitrogen. In the cae of polyaniline, such molar proportions can range from about 0.01 to about 8, per polymer repeat unit.

The reaction can be carried out as a heterogeneous reaction wherein the polymer starting material is not dissolved but is reacted directly with the anhydride, or the polymer starting material, such as polyaniline non-conductive free-base, can be dissolved in a suitable solvent which does not react irreversibly with the anhydride, e.g., N-methyl pyrrolidone, dimethylsulfoxide (DMSO), dimethylformamide (DMF), formic acid, dimethylacetamide (DMAC), acetonitrile and pyridine.

The reaction is generally carried out at about ambient or room temperature, e.g., 20-25°C., or at higher or lower temperatures.

The rate of reaction can range widely, depending on the particular anhydride reactant employed. Thus, the reaction rate can range from almost instantaneous to several hours or longer.

In the case of polyaniline free-base, this is a high polymer having a molecular weight of the order of 50,000 to 80,000. Lower molecular weight forms of polyaniline can also be employed, such as an oligomer of polyaniline containing 8 sub-units and having a molecular weight of about 800 to 900.

The conductivity of the resulting conductive polymers, e.g., conductive polyaniline, can be varied by reducing or increasing the number of covalently linked polyimide-like side chains, as by controlling the degree of completeness of the reaction and/or by varying the types of anhydride or mixed anydrides employed in producing such side chains on the polymer.

Any commercially available polyimide or polyimide precursor is suitable for blending with the above conductive polymer, e.g., conductive polyaniline, containing the above-noted polyimide-like side chains.

An example of a suitable polyimide is the commercially available polyimide marketed as "6F44" by Amercian Hoechst and having the repeat unit:

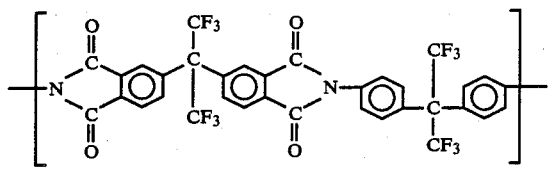

An example of a polyimide precursor is the material marketed as EYMYD resin by the Ethyl Corporation, a solution processable polyamic acid having the repeat unit:

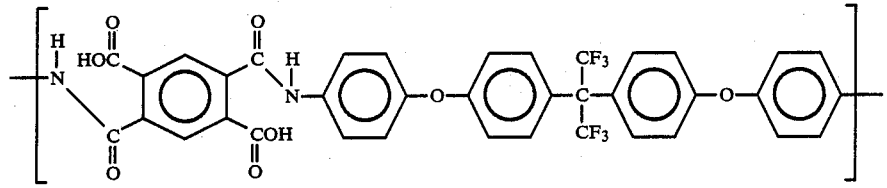

Another example of a polyimide precursor is the 50:50 molal misture of a dianhydride and a diamine, corresponding to the materials marketed as 6FDA and APB shown below:

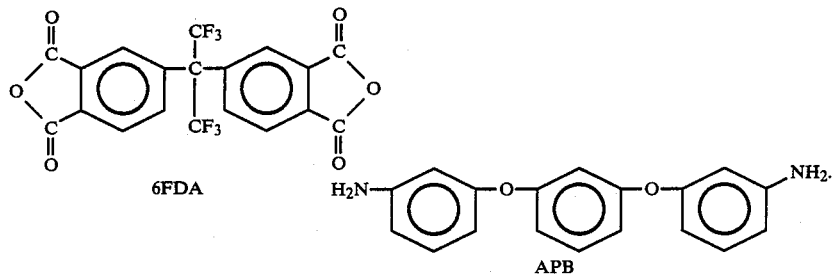

Polyisooimides are further examples of polyimide precursors. On heating, polyisoimides are converted ot polyimides.

Further, instead of blending the derivatized conductive polymer, e.g., polyaniline, with preformed polyimide, or with polyimide precursor, the non-conductive polyaniline can be mixed with, e.g., a dianhydride and a polyimide to produce reaction of the polyaniline with the anhydride to form the derivatized polyaniline in situ with the polyimide. Alternatively, the non-conductive polyaniline can be mixed with a dianhydride and a diamine, such as the material marketed as K$_2$ resin by DuPont, with a portion of the dianhydride reacting with the polyaniline to derivatize same, and the remaining portion of the dianhydride reacting with the diamine to form the polyimide in situ.

Polyimide precursors have the advantage of being more soluble than polyimide.

Where the polyimide precursors are used in admixture with the derivatized polymer, e.g., polyaniline, in a solvent, the solvent is first evaporated and the resin mixture or film is heated to convert thte polyimide precursor to polyimide.

The conductive polymer containing thte polyimide-like side chains can be blended in a wide range of proportions with non-conductive polyimide or polyimide precursor, generally ranging from about 1 to about 99% conductive polymer to 1 to about 99% non-conductive polyimide or polyimide precursor, by weight. Particularly to obtain higher conductivity, it is preferred to employ about 50 to about 99% conductive polymer and about 1 to about 50% non-conductive polyimide or polyimide precursor, by weight. Such blending can be carried out by mixing the conductive polymer containing polyimide or polyimide precursor in a suitable solvent, such as N-methyl pyrrolidone. Other solvents which can be employed are noted above. If desired, the reaction of the non-conductive base-type polymer, such as polyaniline, with the appropriate anhydride, can be carried out in a suitable solvent, such as N-methyl pyrrolidone, and the polyimide or polyimide precursor can then be added to the resulting reaction mixture containing the resulting conductive base-type polymer having the anhydride or polyimide-like side chains. The presence of the polyimide-like side chains causes the conductive base-type polymer, such as polyaniline, to be highly soluble, together with the polyimide or polyimide precursor, in the solvent solution. The bestt solubility is achieved when the dianhydride side chain of the polyaniline contains the same dianhydride which is in the polyimide structure with which the derivatized polyaniline is blended.

When the resulting solution is applied to a suitable substrate, such as SiO$_2$, and the solvent is evaporated, a tough, flexible film in the form of a continuous phase blend of the conductive polymer and the polyimide is obtained, which has high electrical conductivity. Where a polyimide precursor is employed, as previously noted, the film is heated to convert the precursor to polyimide. The proportions of base-type polymer and polyimide in the continuous phase blend forming the conductive film is the same as that noted above in preparing the solutions of the blends. It is particularly noteworthy that both the conductive polymer, particularly conductive polyaniline, and the polyimide, are quite thermostable at temperature up to about 350 °C., and the resulting blend of the two polymers is a continuous single phase having high thermostability. The blended polymer also has the good mechanical properties of a polyimide while having the good electrical conductivity properties of the conductive base-type polymer, such as conductive polyaniline. The continuous single-phase blends of the conductive polymer and non-conductive polyimides produced according to the invention do not separate out upon forming a film from the blend.

The following are examples of practice of the invention:

EXAMPLE 1

Emeraldine free-base (6 grams) was dissolved in 250 ml of NMP, and the solution was filtered through glass wool. 1/8 equivalent per emeraldine nitrogen of 6 FDA/APB, a polyimide oligomer terminated by anhydrides, was added, and the reaction was allowed to proceed at room temperature for 24 hours. 6 grams of 6F44 commercial polyimide was added. The solvent was removed and the polymer blend formed a tough, flexible,d ark blue-black film having an electrical conductivity of less than $10^{-8}$ S/cm. No fibrillar structure was observed.

EXAMPLE 2

The procedure of Example 1 was carried out under an argon atmosphere, with the addition of 1/2 equivalent per emeraldine nitrogen of tosylic anhydride into the initial reaction mixture.

A film was cast by means of solvent removal by evaporation. The film had a conductivity of .05 S/cm and was tough and flexible.

EXAMPLE 3

The procedure of Example 1 was substantially carried out, except that in place of the polyimide oligomer 6 FDA/APB, the anhydride 6 FDA in the same proportion was added to the initial reaction mixture.

Following removal of solvent, the polymer blend formed a tough flexible film having an electrical conductivity similar to that of the film formed in Example 1.

EXAMPLE 4

The procedure of Example 1 was carried out except the final film was soaked in an aqueous solution of tosylic acid for 24 hours to yield a film having a conductivity of .0 S/cm.

EXAMPLE 5

6 grams polyaniline emeraldine free-base was dissolved in 250 ml DMSO (dimethyl sulfoxide) and the solution was filtered under argon. 1/8 equivalent of pyromellitic dianhydride was added to the solution. EYMYD resin in DMSO was then added under argon. The solution was stirred for 4 hours. The solvent was then removed to yield a green film. Upon heating, the green film turned blue showing the polyamic acid had condensed to form the polyimide.

EXAMPLE 6

The procedure of Example 5 was carried out, except that 1/2 eq. tosoylic anhydride was added to the DMSO solution prior to removal of the solvent.

EXAMPLE 7

6 grams emeraldine free-base was dissolved in 250 ml formic acid and the solution was filtered. 6 FDA (1 gram) and 1 gram APB were added to the solution. The sollvent was evaporated by heating. The solution was then heated further to yield a conductive film.

EXAMPLE 8

The procedure of Example 7 was carried out, except that 1/2 gram of tosylic anhydride was added prior to removal of the solvent.

EXAMPLE 9

The procedure of Example 1 was carried out, except that the isoimide having the repeating unit shown below was used instead of the polyimide 6 F44:

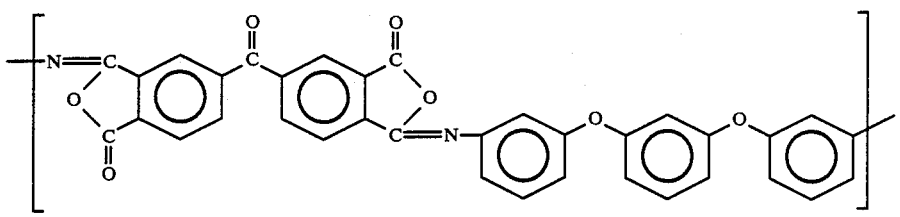

Following removal of solvent, the solution was heated to form a conductive film.

The electrically conductive polymer blends of the invention have utility in the production of conductive composites, electronic components, electrical conductors, electrodes, batteries, switches, electrical shielding material, resistors, capacitors, and the like.

From the foregoing, it is seen that the invention provides a novel class of conductive polymer materials which can be readily cast into tough, flexible conductive films, by reacting certain organic anhydrides, particularly dianhydrides, with a non-conductive polymer, e.g., base-type non-conductive polymers such as polyaniline, to provide polyimide-like chains covalently linked to the nitrogen atoms of such polymers, and blending the so-formed polymers with a polyimide or polyimide precursor. The resulting mixture upon removal of solvent, and further heating where a polyimide precursor is employed, forms a continuous phase blend. In effect, the present invention renders polyimides conductive by doping with conductive polymer containing polyimide-like side chains. This results in easily processable, highly thermally stable conductive polymer blends.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing a conductive polymer blend which comprises:
   mixing a polyimide or polyimide precursor with a conductive polymer comprising a base-type polymer containing carbon-nitrogen linkages having a polyimide-like group covalently linked to nitrogen atoms of said base-type polymer, in a suitable solvent, said polyimide-like group having the structural unit

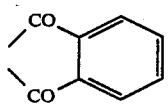

wherein a —CO group of said structural unit is convalently linked to said nitrogen atoms, and employing about 1 to about 99% of said base-type polymer andn about 1 to about 99% of said polyimide or said polyimide precursor, by weight, removing said solvent, and forming a conductive continuous phase blend of said polyimide and said conductive polymer.

2. The process of claim 1, employing said precursor, including the step of heating the mixture after removing said solvent to form a polyimide.

3. The process of claim 1, said base-type polymer selected from the group consisting of polyaniline, its naphthyl and biphenyl derivatives, and alkyl and aryl substituted polyaniline and its alkyl and aryl substituted naphthyl and biphenyl derivatives.

4. The process of claim 1, said polyimide-like group being derived from a polyimide oligomer terminated by anhydride groups.

5. The process of claim 1, wherein said base-type polymer is polyaniline.

6. The process of claim 1, employing a polyimide precursor selected from the group consisting of polyamic acid, a mixture of a dianhydride and a diamine, and a polyisoimide, and including heating the mixture of a conductive polymer and polyimide precursor after removal of solvent to convert the precursor to polyimide.

7. The process of claim 6, wherein said base-type polymer is polyaniline.

8. A process for producing a conductive polymer blend which comprises:

reacting a base-type non-conductive polymer containing carbon-nitrogen linkages with an effective amount sufficient to increase electrical conductivity of a carbonyl anhydride containing a polyimide-like structural unit, and forming a conductive base-type polymer containing carbon-nitrogen linkages and having a polyimide-like group covalently linked to nitrogen atoms of said base-type polymer, said polyimide-like group having the structural unit

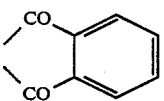

wherein a —C group of said structural unit is convalently linked to said nitrogen atoms, mixing a polyimide or a polyimide precursor with said conductive base-type polymer in a suitable solvent, employing about 1 to about 99% of said conductive base-type polymer and about 1 to about 99% of said polyimide or said polyimide precursor, by weight, removing said solvent, and forming a conductive continuous phase blend of said polyimide and said conductive polymer.

9. The process of claim 8, said carbonyl anhydride being a dianhydride.

10. The proces of claim 8, said carbonyl anhydride having the formula:

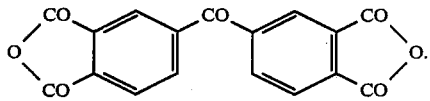

11. The process of claim 8, said carbonyl anhydride being a polyimide oligomer terminated by anhydride groups.

12. The process of claim 8, said carbonyl anhydride being a polyimide oligomer having the formula

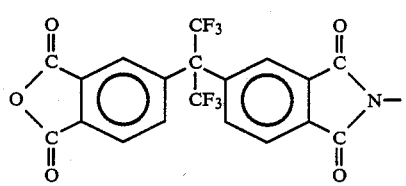

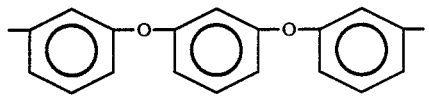

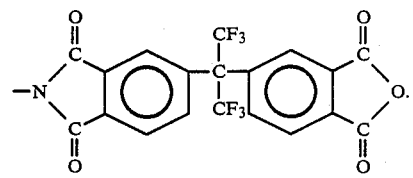

13. The process of claim 8, said base-type non-conductive polymer being polyaniline.

14. The process of claim 8, said base-type non-conductive polymer being polyaniline and employing a polyimide precursor selected from the group consisting of polyamic acid, a mixture of a dianhydride and a diamine, and a polyisoimide, and including heating the mixture of a conductive polymer and polyimide precursor after removal of solvent to convert the precursor to polyimide.

15. An electrically conductive polymer materiall of comprising a continuous phase blend of a polyimide and atype base-type conductive polymer containing carbon-nitrogen linkages and having a polyimide-like group covalently linked to nitrogen atoms of said base-type polymer, said polyimide-like group having the structural unit

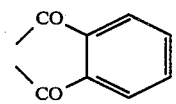

wherein a —CO group of said structural unit is convalently linked to said nitrogen atoms, said electrically conductive polymer material containing about 1 to abou 99% of said base-type conductive polymer andn about 1 to abou 99% of said polyimide, by weight.

16. The electrically conductive polymer material of claim 15, containing about 50 about 99% of said base-type conductive polymer and about 1 to about 50% of said polyimide, by weight.

17. The electrically conductive polymer material of claim 15 said base-type polymer selected from the group consisting of polyaniline, its naphthyl and biphenyl derivatives, and alkyl and aryl substituted polyaniline and its alkyl and aryl substituted naphthyl and biphenyl derivatives.

18. The electrically conductive polymer material of claim 17, said polyimide-like group being derived from a polyimide oligomer terminated by anhydride groups.

19. The electrically conductive polymer material of claim 15 wherein said polyimide-like group is derived from 3,3',4,4'-benzophenone tetracarboxylic dianhydride.

20. The electrically conductive polymer material of claim 18, said polyimide-like group being derived from the polyimide oligomer having the following structure:

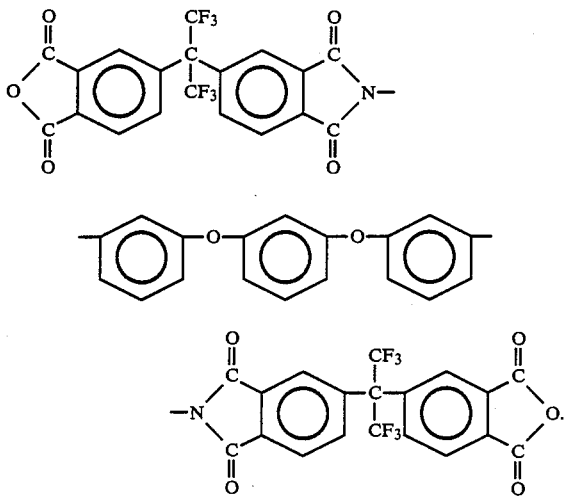

21. The electrically conductive polymer material of claim 15, said base-type polymer being polyaniline.

22. The electrically conductive polymer material of claim 15, said polyimide-like group being derived from a polyimide precursor.

23. The composition of claim 20, said base-type polymer being polyaniline.

24. A composition suitable for foroming an electrically conductive polymer material comprising a mixture of a polyimide precursor selected from the group consisting of polyamic acid, a mixture of a dianhydride and a diamine, and a polyisoimide, and a base-type conductive polymer containing carbon-nitrogen linkages and having a polyimide-like group covalently linked to nitrogen attoms of said base-type polymer, said polyimide-like group having the structural unit

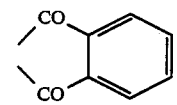

wherein a—C group of said structural unit is convalently linked to said nitrogen atoms,
said electrically conductive polymer material containing about 1 to about 99% of said base-type conductive polymer and about 1 to about 99% of said polyimide precursor, by weight.

25. A conductive polymer blend produced by the process of claim 1.

26. A conductive polymer blend produced by the process of claim 8.

27. A conductive polymer blend produced by the process of claim 13.

28. A conductive polymer blend produced by the process of claim 14.

29. The process of claim 8, the molar proportions of said carbonyl anhydride to said base-type non-conductive polymer ranging from about 0.01 to abou 2 said —C per nitrogen of said polymer.

30. The process of claim 13, the molar proportions of said carbonyl anhydride to said polyaniline ranging from about 0.01 to about 8, per polymer repeat unit.

* * * * *

UNITED STATES PATENT AND TRADEMARK OFFICE
CERTIFICATE OF CORRECTION

PATENT NO. : 4,855,361
DATED : 8 August, 1989
INVENTOR(S) : Stuart I. Yaniger and Randy E. Cameron It is certified that error appears in the above-identified patent and that said Letters Patent is hereby corrected as shown below:

Column 9, line 17, "10-8" should be changed to --$10^{-8}$--.

Column 9, line 57, ".0" should be changed to --.05--.

Column 11, line 14; column 11, line 62; column 12, lines 65 and 66; and column 14, lines 23 and 24: "convalently" should be changed to --covalently--.

Column 11, line 16 and column 13, line 1, "andn" should be changed to --and--.

Column 11, line 61, and column 14, line 23, "-C" should be changed to -- -CO--.

Column 12, line 51, "materiall of" should be changed to --material--.

Column 12, line 53, "atype" should be changed to --a--.

Column 14, line 39, "abou 2 said -C" should be changed to --about 2 of said -CO groups--.

Column 5, line 2, "R" should be changed to --R'--.

Signed and Sealed this

Third Day of July, 1990

*Attest:*

HARRY F. MANBECK, JR.

*Attesting Officer*     *Commissioner of Patents and Trademarks*